Jan. 10, 1961 D. H. COATES 2,967,632
PICK-UP GRABS FOR FILLED SACKS
Filed July 25, 1958 3 Sheets-Sheet 1

DONALD HENRY COATES
INVENTOR
by Richardson, David & Nordon
ATTORNEYS

DONALD HENRY COATES
INVENTOR
by Richardson David & Nordon
ATTORNEYS

United States Patent Office 2,967,632
Patented Jan. 10, 1961

2,967,632

PICK-UP GRABS FOR FILLED SACKS

Donald Henry Coates, Swine, near Hull, England, assignor to Chisholm, Fox & Garner Ltd., Hull, England Filed July 25, 1958, Ser. No. 751,086

8 Claims. (Cl. 214—147)

This invention relates to sack lifting gear and in particular to a grab for taking hold of a filled sack for use in combination with means for lifting or elevating the same.

A farmer using a combine harvester has to collect the sacks of grain deposited on the ground from the harvester and this usually means the employment of at least three men, one to drive the tractor pulling a wagon such as a rulley and the other two to lift together each sack in turn and throw it onto the rulley where a fourth man may be employed to pack the sacks. Subsequently the sacks have to be unloaded by hand from the rulley and then taken into the granary while at other times the filled sacks have again to be taken up with the expenditure of laborious human energy by several pairs of hands.

Various attempts have been made to provide satisfactory grabs for taking hold of filled sacks for use in particular with hoists and such like elevators but the means previously proposed have either been too complicated, do not take an adequate grip on the sack or else they are liable to tear the sack.

Now the object of the present invention is to provide a mechanical grab for gripping the necks of filled sacks and further to provide such a grab for mounting on elevating means of a tractor such that filled sacks may be picked up from the ground and either transported or placed on a rulley and whereby filled sacks in storage or as a load on a vehicle may be picked up for elevation, transportation or re-positioning.

To this end according to the present invention, the sack lifting grab comprises a pair of spring loaded members pivoted together and each having a jaw at its free end, links to separate said members against spring action, means for moving the links and a mounting movable relative to the members and having means for preventing separation of the members on lifting movement of such mounting.

In a preferred form of the present invention, the one member carries a recessed jaw and the other member carries a complementary jaw. Spring means urge the members in jaw closing direction. An over-centre linkage moves the members apart and holds them separated. The mounting comprises spaced bars between which the members pass for normally free movement and from which depends cam means co-operating with a projecting member on at least one of said members to hold them in closed position on lifting movement.

The cam means may comprise a link depending from a suspension bar and an inclined link pivoted to the depending link and to the recessed jaw member and having a recess forming a cam slope, with the other jaw member carrying a laterally extending member on which the inclined link is effective.

The mounting or suspension bar has trunnions at its ends which are engaged by lifting or hoist means and preferably by the ends of extension members extending forwardly of a power operated foreloader of known design on an agricultural tractor. The arrangement is such that the action of the means effective on the linkage in a direction to open the jaws tends to move the jaw members of the grab relative to the suspension bar in the direction to permit opening of the jaw members on nullification of the cam locking means. Once opened the jaw members are held open by over-centre action of the linkage. With the jaws open the grab is lowered until the recessed jaw is positioned against the neck of a filled sack whereupon the means effective on the linkage is reverse actuated. The complementary jaw closes under the spring urging to co-operate with the recessed jaw in taking a firm but non-tearing grip on the sack. On elevating the grab the consequent movement of the suspension bar relative to the jaw members causes the cam means to become effective to hold them from opening.

The means effective on the linkage may be a push-pull member such as a push-pull cable-operated slide or the equivalent, a member operated by a push-pull linkage or a member operated by a hydraulic jack or equivalent means, such as an electric actuator.

The recessed jaw may comprise a substantially semi-circular member with a rounded curved edge when the co-operating jaw is a circular plate which may be flat or provided with a circumferential rounded flange. The co-operating jaw is carried by the other limb by means which preferably have a limited degree of angular displacement.

In order that the invention may be clearly understood an embodiment thereof is by way of example, hereinafter more fully described with reference to the accompanying drawings which are also given for purposes of illustration only and not of limitation.

Figure 1:
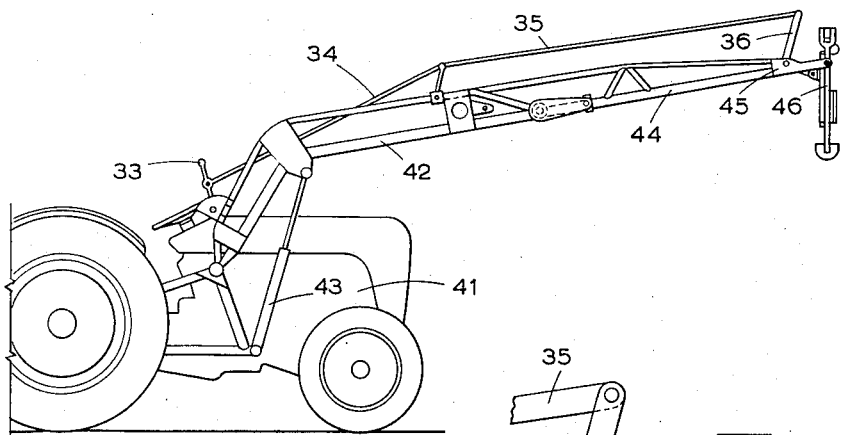
Fig. 1 is a side elevation of a tractor with its power operated foreloader which is provided with an extension carrying the sack lifting grab.

As previously explained and as illustrated in Fig. 1, the grab is intended to be mounted on a tractor 41 having a foreloader 42 which is power raised and lowered as by a hydraulic jack 43. The usual scoop or bucket of the foreloader 42 is removed and there is provided instead an extension bar 44 preferably one readily separable from the foreloader. The extension bar 44 terminates at its free end in a fork or bifurcated member 45 in which are journals for trunnions of the grab, identified as a whole in Fig. 1 by the numeral 46.

Figure 2:
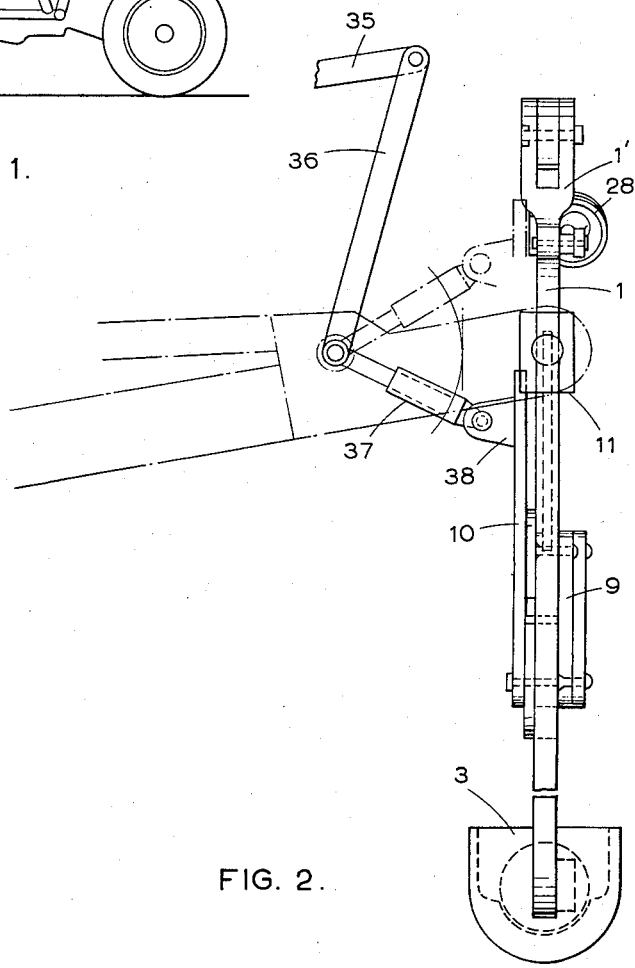
Fig. 2 is a view on an enlarged scale of the sack grab as seen in Fig. 1.

The grab 46 comprises a first jaw member or limb 1 which is bifurcated at its end 1' and thereat is pivoted a second jaw member or limb 2. The limb 1 carries at its free end a jaw 3 which is circular or substantially semi-circular in shape as illustrated in Figs. 1, 2 and has a rounded edge. The limb 2 has a complementary jaw co-operating with the recessed jaw 3. The complementary jaw conveniently takes the form of a disc 5 which may be flat or provided with a rounded circumferential flange 5'. The jaw 5 is carried at the end of a member 6 which may have a limited degree of angular movement with respect to the limb 2 about its point of connection 7.

Figure 3:
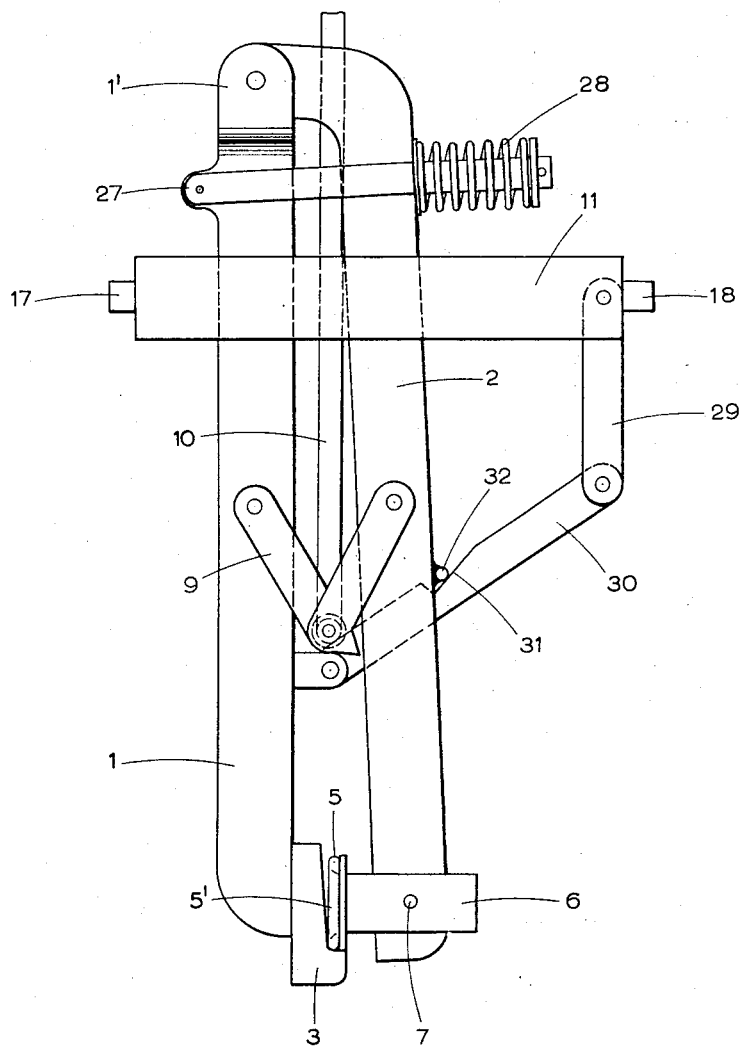
Fig. 3 is an elevation of the sack grab being a view looking on the right hand side of the sack grab of Fig. 2.

A spring assembly, comprising a rod or bar 27 pivoted to the limb 1 and extending through a coil spring 28 held by the free end of the part 27 and bearing the limb 2, tends to urge the limbs towards one another to close the jaws 3, 5 together as in Fig. 3.

Figure 4:
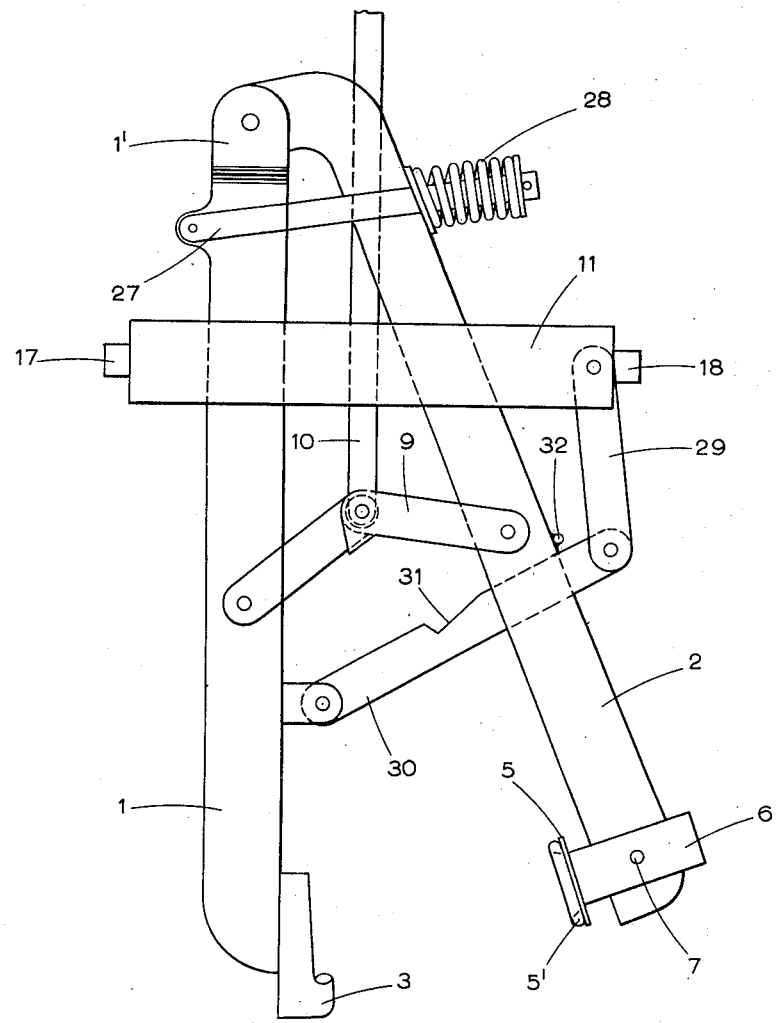
Fig. 4 is a similar view to Fig. 3 with the grab limbs separated and the jaws open.

A pair of links 9 pivotally engage with the limbs 1, and 2 respectively and at their centre similarly engage an axially movable member 10 so that an upward pull on the member 10 opens the linkage to move the limbs 1, 2 apart, the linkage 9 subsequently passing overcentre as in Fig. 4 to hold the limbs separated.

A suspension bar 11 may be conveniently formed of flat bars held in spaced relation by end pieces. The limbs 1, 2 of the grab extend through the suspension bar 11 so that the bar is normally freely displaceable lengthwise of the limbs of the grab. A stud or abutment (not shown) may limit the extent of euch free relative movement.

Trunnions 17, 18 are provided on the ends of the bar 11 and these trunnions engage in the journals in the fork end of the extension bar 44 of the foreloader 42.

The bar 11 carries a depending link 29 connected by a link 30 to the limb 1 or to a part fast therewith. The link 30 has a recess forming a cam slope 31. The limb 2 carries a laterally extending member 32. This arrangement is such that a pull on the member 10 with consequent axial movement thereof upwardly, moves the links 9 to separate the limbs 1, 2 and also lifts the limbs 1, 2 with respect to the suspension bar 11 which lifts the member 32 out of the recess in the link 30 and allows member 32 to slide on the upper edge of link 30 or move thereabove during separation of the limbs 1, 2 against the action of the spring 28. When the links 9 pass overcentre the limbs 1, 2 are held separated as in Fig. 4.

The tractor 1 may now be maneuvered with appropriate lowering of the foreloader 2 to bring the jaw 3 adjacent the neck of a filled sack it is desired to lift. Thereupon the member 10 is moved in reverse direction, i.e. downwardly, so that links 9 pivot over centre to the position of Fig. 3. The spring 28 moves the limb 2 toward limb 1 so that jaw 5 closes onto the neck of the sack and grips the sack between itself and the jaw 3. When the neck is gripped by the jaws, member 32 contacts the upper edge of link 30 at a point between cam slope 31 and the upper end of link 30.

On elevating the foreloader 42 to lift the sack, the initial upward movement of the extension 44 moves the bar 11 upwardly. As bar 11 begins to rise, the weight of the sack on limbs 1, 2 causes link 30 to swing up about its point of connection to the limb 1 and thrust on the member 32. This thrusting action is increased as member 32 enters the camming recess in the link 30 so that cam slope 31 becomes effective on the member 32. This mechanical thrust due to the weight of the sack augments the action of the spring 28 in closing the limb 2 towards the limb 1. It also prevents separation of the limbs under load on the jaws, 3, 5 and prevents release of the held sack.

The member 10 which actuates the links 9 may be moved by any convenient means such as a push-pull cable, a jack or by a linkage as illustrated in Figs. 1 and 2. It may comprise an operating lever 33 convenient to the tractor driver's hand connected by rods 34, 35 to one limb of a bell-crank lever 36 pivoted to the fork 45. The other limb of the bell-crank lever 36 is slidably telescoped in a tube 37 as shown in Fig. 2. Tube 37 is pivoted to a bracket 38 fast with the member 10. Thus by rocking the lever 33, the member 10 may be moved axially up and down between its alternative positions shown in full and broken lines respectively in Fig. 2.

With a grab as described carried by an extension of the foreloader of a tractor, one man driving the tractor can pick up a filled sack from the ground or any elevated support within the range of movement of the extended foreloader. After picking up the sack he may then transport it to a desired position and place it where required, for example on a rulley. He can then release the sack by operating the lever 33 to raise member 10 and pivot links 9 to cause the jaws to open.

I claim:

1. A sack lifting grab, comprising a pair of elongated members pivotally joined together at one end, each member having a jaw at the other free end thereof, a first link means pivotally connecting the members for separating and closing the jaws thereon, a suspension means movable relative to said members, a second link means connecting said suspension means and members, spring means urging said members together to close said jaws, and cam means coacting with said second link means to apply a closing force to said members upon movement of said suspension means, said force being supplemental to closing forces exerted by said spring means and said first link means.

2. A sack lifting grab, comprising a pair of elongated members pivotally joined together at one end, each member having a jaw at the other free end thereof, a first link means pivotally connecting the members for separating and closing the jaws thereon, a suspension means movable relative to said members, a second link means connecting said suspension means and members, spring means urging said members together to close said jaws, and cam means coacting with said second link means to apply a closing force to said members upon movement of said suspension means, said force being supplemental to closing forces exerted by said spring means and said first link means, one of said jaws being a recessed element substantially semi-circular in form with a rounded curved edge, the other of said jaws being a disc having a rounded circumferential flange, said disc being pivotally mounted on the member carrying the same.

3. A sack lifting grab, comprising a pair of elongated members pivotally joined together at one end, each member having a jaw at the other free end thereof, a first link means pivotally connecting the members for separating and closing the jaws thereon, a suspension means movable relative to said members, a second link means connecting said suspension means and members, spring means urging said members together to close said jaws, and cam means coacting with said second link means to apply a closing force to said members upon movement of said suspension means, said force being supplemental to closing forces exerted by said spring means and said first link means, said first link means comprising a pair of links and and an actuation rod pivotally connected together, said links being movable by said rod in an overcenter linkage movement for holding the members separated in one position of the links and for closing the members in a second position of the links.

4. A sack lifting grab, comprising a pair of elongated members pivotally joined together at one end, each member having a jaw at the other free end thereof, a first link means pivotally connecting the members for separating and closing the jaws thereon, a suspension means movable relative to said members, a second link means connecting said suspension means and members, spring means urging said members together to close said jaws, and cam means coacting with said second link means to apply a closing force to said members upon movement of said suspension means, said force being supplemental to closing forces exerted by said spring means and said first link means, said suspension means comprising a bar having a transverse passage therethrough, said members passing through and being movable in said passage.

5. A sack lifting grab, comprising a pair of elongated members pivotally joined together at one end, each member having a jaw at the other free end thereof, a first link means pivotally connecting the members for separating and closing the jaws thereon, a suspension means movable relative to said members, a second link means connecting said suspension means and members, spring means urging said members together to close said jaws, and cam means coacting with said second link means to apply a closing force to said members upon movement of said suspension means, said force being supplemental to closing forces exerted by said spring means and said first link means, said suspension means comprising a bar having a transverse passage therethrough, said members passing through and being movable in said passage, said cam means including a notched portion in the second link means and a cam follower carried by one of the members for engagement in said notched portion when said suspension means is elevated with respect to said members.

6. A sack lifting grab, comprising a pair of elongated members pivotally joined together at one end, each member having a jaw at the other free end thereof, a first link means pivotally connecting the members for separating and closing the jaws thereon, a suspension means movable relative to said members, a second link means connecting said suspension means and members, spring means urging said members together to close said jaws, and cam means coacting with said second link means to apply a closing force to said members upon movement of said suspension means, said force being supplemental to closing forces exerted by said spring means and said first link means, said suspension means comprising a bar having a transverse passage therethrough, said members passing through and being movable in said passage, said bar having trunnions at opposite ends thereof whereby said bar may be mounted in journals in elevating means.

7. A sack lifting grab according to claim 4, for a tractor mounted foreloader, wherein said bar has trunnions at opposite ends, elevation means carried at a free end of said foreloader, and journals carried by said elevation means and engaging said trunnions for elevating said bar and applying increased closing force to said members when partially closed by the first linkage means.

8. A sack lifting grab according to claim 4, for a tractor mounted foreloader, wherein said bar has trunnions at opposite ends, elevation means carried at a free end of said foreloader, and journals carried by said elevation means and engaging said trunnions for elevating said bar and applying increased closing force to said members when partially closed by the first linkage means, there being means convenient to the tractor driver's hand remote from said end of the foreloader operatively connected to said rod for actuating the first linkage means to open and close said members.

References Cited in the file of this patent

UNITED STATES PATENTS

| | | |
|---|---|---|
| 994,506 | Falcone | June 6, 1911 |
| 2,674,385 | Stauth et al. | Apr. 6, 1954 |
| 2,739,347 | Sharpe et al. | Mar. 27, 1956 |